United States Patent
Jayne

(10) Patent No.: US 10,161,692 B2
(45) Date of Patent: Dec. 25, 2018

(54) TAILORED HEAT TRANSFER CHARACTERISTIC OF FUEL CELL COOLERS

(75) Inventor: David D. Jayne, Manchester, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 1197 days.

(21) Appl. No.: 12/452,698

(22) PCT Filed: Jul. 25, 2007

(86) PCT No.: PCT/US2007/016679
§ 371 (c)(1),
(2), (4) Date: Jan. 15, 2010

(87) PCT Pub. No.: WO2009/014515
PCT Pub. Date: Jan. 29, 2009

(65) Prior Publication Data
US 2010/0119885 A1    May 13, 2010

(51) Int. Cl.
| | | |
|---|---|---|
| H01M 8/04 | (2016.01) |
| F28F 21/02 | (2006.01) |
| F28F 13/14 | (2006.01) |
| F28F 21/06 | (2006.01) |
| H01M 8/0267 | (2016.01) |
| H01M 8/04029 | (2016.01) |
| H01M 8/04007 | (2016.01) |
| H01M 8/0668 | (2016.01) |
| H01M 8/06 | (2016.01) |
| H01M 8/2465 | (2016.01) |
| F28D 7/08 | (2006.01) |
| F28F 3/12 | (2006.01) |
| F28F 13/18 | (2006.01) |
| H01M 8/086 | (2016.01) |
| H01M 8/1018 | (2016.01) |

(52) U.S. Cl.
CPC .............. *F28F 21/02* (2013.01); *F28F 13/14* (2013.01); *F28F 21/062* (2013.01); *H01M 8/0267* (2013.01); *H01M 8/04029* (2013.01); *H01M 8/04074* (2013.01); *H01M 8/0668* (2013.01); *H01M 8/0693* (2013.01); *H01M 8/2465* (2013.01); *F28D 7/08* (2013.01); *F28F 3/12* (2013.01); *F28F 13/18* (2013.01); *H01M 8/086* (2013.01); *H01M 2008/1095* (2013.01)

(58) Field of Classification Search
CPC ...................................................... H01M 8/04
USPC ................................. 429/433, 434, 436, 452
See application file for complete search history.

(56) References Cited

U.S. PATENT DOCUMENTS 7,090,942 B2* 8/2006 Bunker .......................... 429/434
7,820,315 B2* 10/2010 Kikuchi et al. ................ 429/434

* cited by examiner

*Primary Examiner* — Alexander Usyatinsky
*Assistant Examiner* — Julian Anthony
(74) *Attorney, Agent, or Firm* — Carlson, Gaskey & Olds, P.C.

(57) ABSTRACT

The thermal profile of one or more fuel cells (10) cooled by coolant flowing in coolant flow passageways (30, 31, 33, 34, 37-41, 45-50) is tailored by providing selected material (65, 68) adjacent a portion (33b) of the coolant passageway; the selected material has a different thermal transfer characteristic than material surrounding other portions of the coolant passageway. The material may be more insulative or more conductive. The material may be wrapping (65), such as shrink wrap, about a coolant tube, or it may be altered material (68) in a molding material.

19 Claims, 5 Drawing Sheets

TAILORED HEAT TRANSFER CHARACTERISTIC OF FUEL CELL COOLERS

TECHNICAL FIELD

A fuel cell stack has fuel flow field and cooler planforms that promote a high degree of electrolyte condensation. The heat transfer characteristics of coolant flow paths are selectively tailored, such as to maintain a sufficiently high reaction temperature to mitigate CO poisoning of the catalysts.

BACKGROUND ART

In known fuel cell systems employing phosphoric acid electrolyte or a high temperature polymer electrolyte membrane (HTPEM), cooler plates interposed between groups of fuel cells have a simple serpentine cooler flow path and utilize water coolant. Liquid water enters the cooler plates and a two-phase, water/steam mixture exits the cooler plates. A small fraction of the heat removal is due to increasing the sensible heat of the water as it increases to its boiling temperature, and a major fraction of heat removal is due to the latent heat of evaporation of liquid water to steam. U.S. Pat. No. 3,969,145 describes such a coolant system.

In any phosphoric acid fuel cell, the useful life of the fuel cell is determined principally by the rate at which phosphoric acid evaporates into the reactant gases and is not condensed back to a liquid before exiting the fuel cells. Non-reactive acid condensation zones at the reactant gas exits of the fuel cells minimize acid loss due to evaporation and thereby maximize life of the fuel cell stack. Such condensation zones are taught in U.S. Pat. Nos. 4,345,008 and 4,414,291, and in PCT patent publication WO 00/36680. The condensation zones should be below 140° C. (280° F.) in order to assure sufficient condensation of electrolyte so that the fuel cell stack will perform for at least ten years, which in turn requires that the coolant inlet temperature must be less than 140° C. (280° F.) in prior systems.

A competing problem in a phosphoric acid fuel cell stack is that the fuel processing system, such as a steam reforming fuel processor, converts various hydrocarbon fuels to hydrogen-rich reformate which contains between 0.3% and 1.0% carbon monoxide (CO), which is a poison to the anode catalyst and impedes the oxidation of hydrogen at the anode. The extent of poisoning is a function of the concentration of CO and cell temperature. At the likely concentrations of CO referred to hereinbefore, the temperature within the electrochemically active portion of each cell must be kept above 150° C. (300° F.) in order to provide reliable fuel cell performance. Thus, the temperature suited for condensation is lower than the temperature required for CO tolerance.

In patent publication US 2006/0141312, coolant inlets are adjacent the non-reactive zones of the fuel cells, the resulting low temperatures promoting condensation of electrolyte which has evaporated into the reactant gases of the fuel cells. Coolant in a second zone, adjacent to the non-reactive zone, flows generally toward the non-reactive zone assuring the edge of the reactive zone adjacent to the non-reactive zone will be at a temperature high enough to mitigate CO poisoning of the catalysts.

Referring to FIG. 1, a fuel cell stack 9 of said publication includes a plurality of fuel cells 10 having three zones 11-13. Each of the zones 11-13 generally overlaps one of three fuel flow passes in the fuel flow channels. Fuel enters through a fuel inlet manifold 17, and flows to the right (as seen in FIG. 1) through the fuel flow fields associated with the third zones 13. Then the fuel flows through a turnaround manifold 19 and then to the left (as seen in FIG. 1) through the fuel flow fields associated with the second zones 12, to a second turnaround manifold 20, and then to the right (as seen in FIG. 1) through the flow fields associated with the first, non-reactive zones 11, and outwardly through a fuel exit manifold 22.

The first zones 11 are non-reactive because the portion of each fuel cell comparable with the first zones 11 does not have a cathode catalyst and therefore will not react with the reactant gases.

In the embodiment herein, the oxidant reactant gas, such as air, flows into an air inlet manifold 25 and then flows downwardly (as seen in FIG. 1) through the oxidant reactant gas flow fields in the third zones 13, the second zones 12, and the first zones 11, and thence outwardly through an air outlet manifold 26.

In FIG. 2, the fuel cell stack 9 planform configuration is shown as in FIG. 1, but in addition, includes the pattern of coolant flow passageways, such as tubing or channels, in cooler plates, which typically are placed between groups of several fuel cells, throughout the fuel cell stack. For instance, in a 200 kW fuel cell system, there may be 35 coolers, placed between each group of eight fuel cells in a stack of 272 fuel cells. The cooler plates are fed through external coolant manifolds, including a coolant inlet manifold 29 and a coolant outlet manifold 30.

From the inlet manifold 29, the coolant flows adjacent the first, non-reactive zones 11 to the left and then to the right through coolant flow passageway segments 30, 31 respectively. Thus, the coolest coolant is provided adjacent non-reactive zones so as to cause significant condensation of electrolyte which may have evaporated into the reactant gases, as the reactant gases flow out of each of the fuel cells, without the cool temperature supporting CO poisoning of catalyst.

The coolant then flows through segments 33 of the coolant flow passageways adjacent the first zones 11, the second zones 12 and the far side (to the right in FIG. 3) of the third zones 13. The coolant then flows through segments 34 of the coolant flow passageways adjacent the third zones 13 and the second zones 12.

A "substack" is a group of cells between two cooler plates. The center cells within a substack are the hottest and the cells adjacent the coolers are the coolest. Acid loss is proportional to the local temperature at the exit of each pass of fuel or air. Extensions 33-34 lower the local temperature at the exit of the first fuel pass and thus reduce acid loss into the first fuel pass relative to a cooler plate design that does not have extensions 33-34. The fuel reactant of the several cells of a substack are well mixed together in fuel turn manifold 19. This results in all cells within the substack receiving a uniform quantity of acid. The hot cells receive less acid than they lost and the cold cells receive more acid than they lost.

The coolant then flows through serpentine flow segments 37-41 in a direction which is parallel with the direction of the oxidant reactant gas flow, from top to bottom as seen in FIG. 1, adjacent the second zones 12. This results in a reactive zone temperature adjacent to the non-reactive, condensation zones, that is above 150° C. (300° F.) which substantially reduces CO poisoning of the anodes. Stated alternatively, the flows adjacent the first, non-reactive, condensation zones 11 and the flows adjacent the second zones 12 are such as to provide a sharp temperature gradient at the interface between the zones 11 and 12, so that the reactive portion of the fuel cell is well above 150° C. (300° F.) to avoid CO poisoning, while condensation will occur in the non-reactive zone at a temperature below 140° C. (280° F.).

The coolant then flows in a serpentine fashion through a plurality of segments 45-50 in a direction which is generally opposite to the flow of oxidant adjacent the third zones 13, to the coolant outlet manifold 30.

If desired, coolant flow channels may be established so that segment 33 joins directly with segment 50, as shown in said publication, and coolant flow in the third zone 13 will be toward the first zone 11. The coolant exit manifold 30 may then be to the left of the air inlet manifold 25.

Alternative fuel and air configurations, modified polybenzimidazole (PBI) membranes, polymer membranes based on polyazoles, polyphosphoric acid and free acid electrolytes, may be used, as in said publication. Single phase coolant, such as water, or dual phase coolant, such as a water/steam mixture may be employed.

The problem with this design is that in order to provide cooling to that portion of the fuel flow just before it enters the turnaround manifold 19, adjacent the segments 33a (FIG. 3) and 34 the region adjacent the segments 33b, shown by hatch lines 60 in FIG. 3, is cooled below the temperature at which sensitivity to CO poisoning is very high. This may be in the range of 150° C. (300° F.) to 165° C. (325° F.). This results from holding the coolant temperature required in the condensation zone 11 sufficiently low for adequate condensation, and the fact that there is relatively little heat generation in the region 60.

SUMMARY

The in-plane thermal profile of fuel cell coolers is tailored to achieve desired fuel cell thermal profiles to enhance fuel cell operation and/or control the reaction of fuel cells to achieve desired operating conditions. Thermal tailoring may be achieved by altering thermal conductance or thermal conductivity. In one example, one portion of a coolant flow channel is insulated to reduce the conduction of heat from adjacent areas of fuel cells into the coolant medium. In other examples, one or more portions may be surrounded with greater heat conductivity to increase conduction of heat to the coolant.

In cooler plates employing metal tubing molded into a cooler plate, the thermal conductivity of portions of the tubing can easily be lowered by applying a wrapper, such as shrink fit plastic (e.g., PTFE) to a portion of the tubing, thereby to insulate that portion and reduce the heat transfer therethrough. If coolant passageways are simply grooves in a substrate, the substrate material can be altered in a region where the heat transfer to coolant in a groove is to be tailored so as to have a different thermal conductivity. Similarly, material having a lower thermal conductivity (a more insulative characteristic) or a higher thermal conductivity (a less insulative characteristic) may be added to material used in a hot press process to mold tubing into the cooler plates.

Other variations will become more apparent in the light of the following detailed description of exemplary embodiments, as illustrated in the accompanying drawings.

MODES(S) OF IMPLEMENTATION

The tailoring of a fuel cell cooler plate thermal profile may be accomplished in a variety of ways. Using Fouriers law of thermal conduction in its simplest form:

Q/A=heat flux, in $W/m^2$
ΔT=temperature differential, in ° C.
ΔZ=length of conduction path, in m
k=QΔZ/AΔT=thermal conductivity, in W/m° C.
h=thermal conductance=k/ΔZ, in $W/m^{2°}$ C.

The rate of heat flow will depend on the thermal conductance, which may be altered by altering the length of the conduction path. However, in a fuel cell cooler plate, it will normally be easier to reach the desired difference in heat conduction (heat flux) by altering the thermal conductivity between the coolant and the cooler plate. This will typically be achieved by selecting a material for, or around, a selected portion of a coolant passageway which has a thermal conductivity that is significantly different (greater or lesser, as the desired result requires) than the thermal conductivity of portions of the coolant passageway other than the selected portion.

The selected portion will be chosen to effect the creation of a desired thermal profile, which may simply be an increase or decrease in temperature in a particular region, or a temperature variance with respect to another region.

Figure 1:
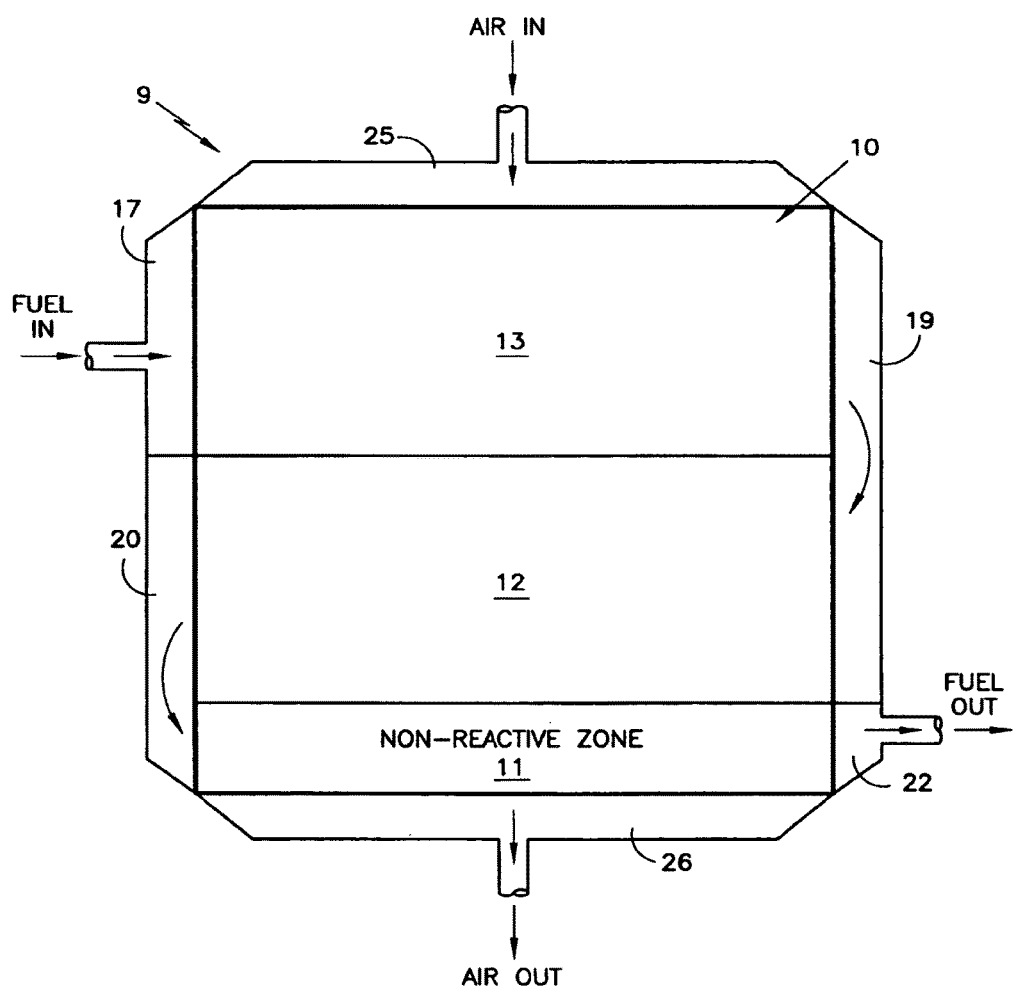
FIG. 1 is a simplified, stylized planform of the air and fuel flow fields of fuel cells known in the prior art, indicating the non-reactive zone.
Figure 2:
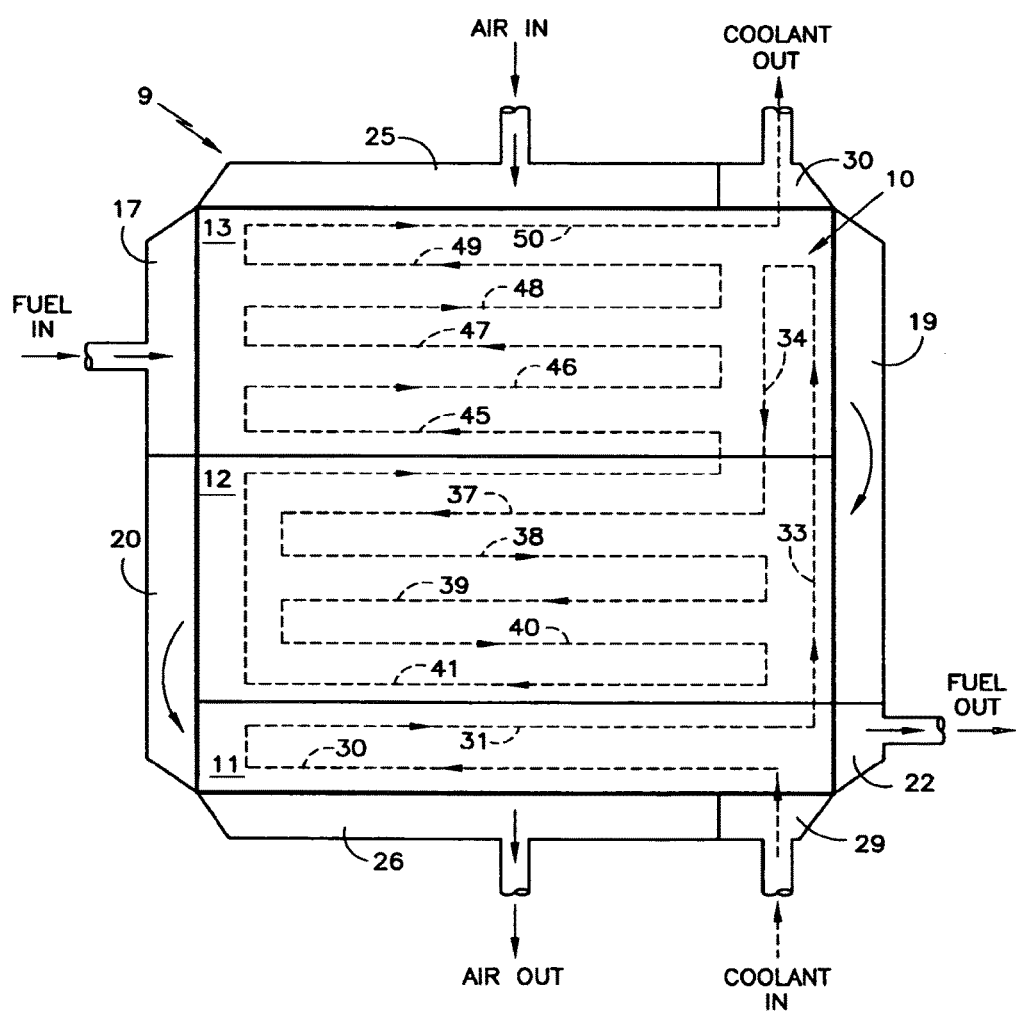
FIG. 2 is a planform as in FIG. 1, with the coolant flow channels illustrated thereon.
Figure 3:
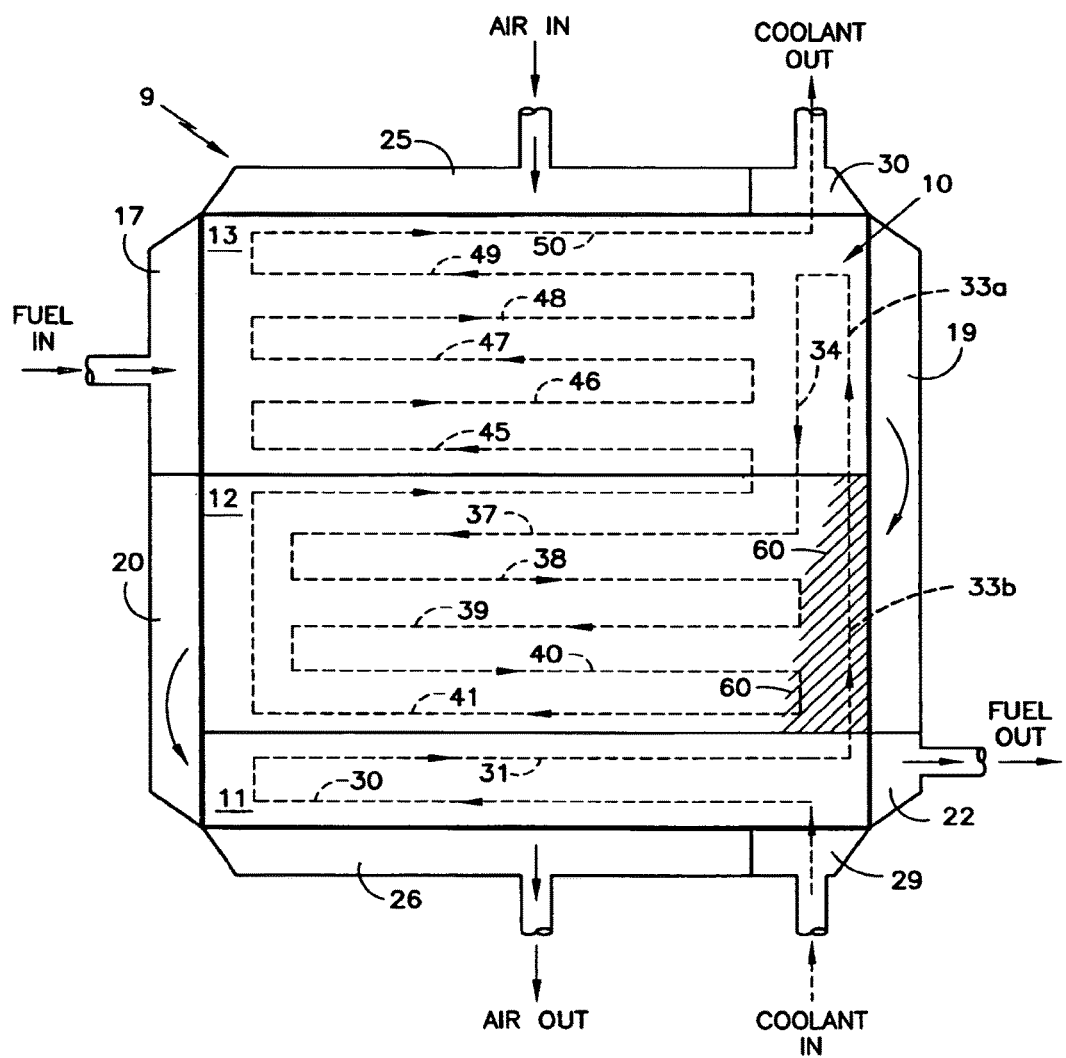
FIG. 3 is a planform as in FIG. 2 illustrating a region in which sensitivity of the fuel cells to CO2 poisoning is high.
Figure 4:
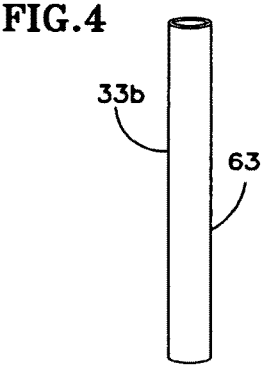
FIG. 4 is a fragmentary perspective of a coolant tube.
Figure 5:
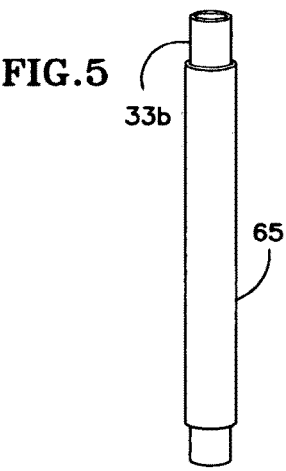
FIG. 5 is a fragmentary perspective of the coolant tube of FIG. 4 wrapped in insulating material.
Figure 6:
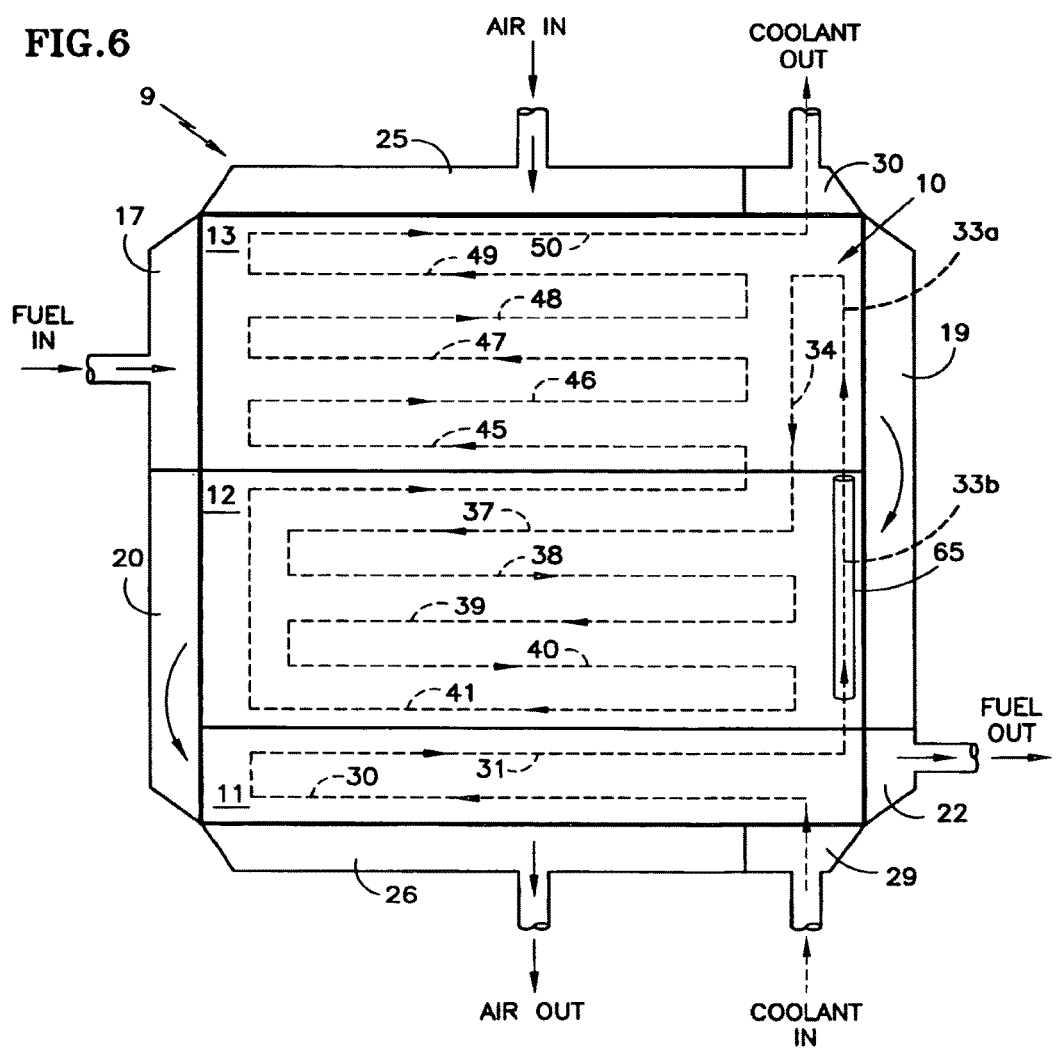
FIG. 6 is a planform as in FIG. 2 illustrating insulation of a portion of a coolant flow channel.

Referring to FIGS. 3 and 4, the coolant passageways, including segments 30-50, may comprise a tube made of metal, such as stainless steel. In FIGS. 5 and 6, one form of tailoring of a thermal profile comprises installing a length 65 of shrink wrap PTFE, such as TEFLON®, along that segment 33b of the coolant passageway which is desired to have less cooling effectiveness than the remainder of the coolant channels. This length of shrink wrap tubing may consist of a uniform thickness, or it may include layers of various lengths to provide a gradient of thicknesses, allowing for an extremely optimized thermal profile.

An alternative method of reducing the heat flux from the cell to the coolant is to alter the coolant passageway material in this region, such as by replacing stainless tubing with Teflon tubing.

Figure 7:
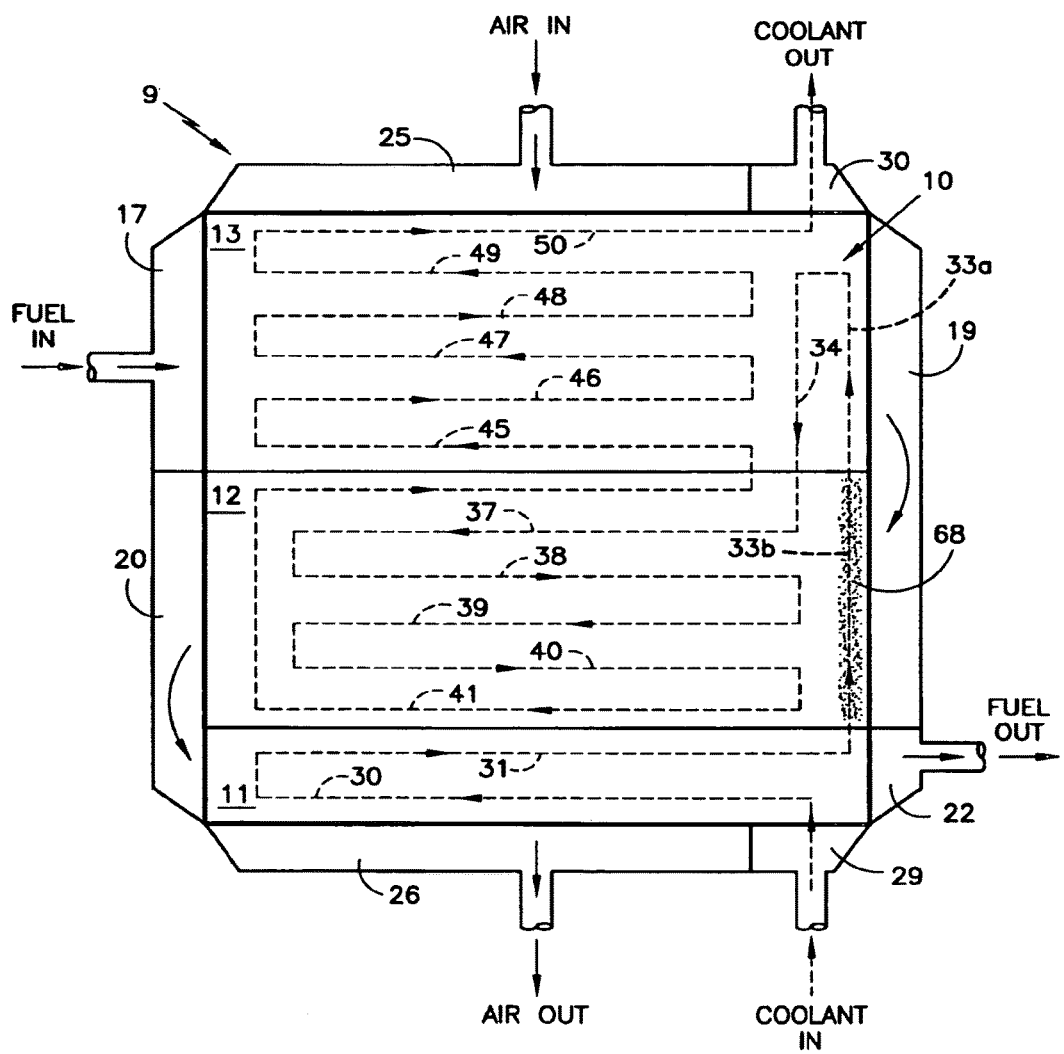
FIG. 7 is a planform as in FIG. 2 illustrating alteration of the molding material in a region adjacent to a coolant channel for which the heat transfer characteristic is to be modified.

FIG. 7 indicates with stippling that the molding material in which coolant channels are formed or coolant pipes are placed may have its thermal conductivity altered in a region where more or less heat transfer is desired, in order to achieve a desired thermal profile within the fuel cells. As an example, typical molding material may be powdered or fibrous carbon or graphite. Selected material with a higher heat conduction characteristic may include powdered metal; selected material with a lower heat conduction characteristic may include powdered PTFE.

Another method of reducing the heat transfer from the cooler to the coolant medium is to surround the cooler with a material of comparable heat transfer coefficient as the base material, but of a structure which results in poor contact between the cooler and the bulk material. An example of this is use of larger size carbon fibers or graphite flakes than incorporated into the base material.

Incorporation of the above-mentioned methods to reduce thermal conductance will result in a higher temperature in the region 33b. This will allow for improved performance, due to decreased CO sensitivity, and also promote better performance in other regions of the cell by allowing for a more uniform thermal profile.

It has been determined that because of the exponential increase in sensitivity of catalyst to CO poisoning with temperature, a small increase in temperature, e.g., from about 150° C. (300° F.) to 155° C. (310° F.) at the beginning of the shaded area 60 can reduce CO poisoning significantly. Similarly, increasing the fraction of the shaded area 60 which is at 165° C. (325° F.) or higher will also provide significant improvement.

Although illustrated herein only with respect to the coolant channel portion 33b, it should be apparent that any part of the coolant flow channel may have heat transfer characteristics altered to suit a desired thermal profile in the fuel cells.

The fuel cells may employ a single phase coolant, such as water, or a two-phase coolant, such as a water/steam mixture.

The invention claimed is:

1. A method comprising:
altering a thermal profile that exists throughout portions of a stack of fuel cells by:
providing a heat transfer characteristic between coolant in a first portion of a coolant passageway and a cooler plate that is thermally coupled to both said coolant passageway and said stack of fuel cells; and
utilizing a material, wrapping, or texture in a second portion of the coolant passageway that is not associated with the first portion and that causes the second portion to provide a heat transfer characteristic between coolant in the second portion and the cooler plate that differs from the heat transfer characteristic of the first portion.

2. The method according to claim 1, wherein said step of altering comprises adjusting thermal conductance of a heat transfer path between said second portion of said coolant passageway and said cooler plate.

3. The method according to claim 2, wherein said step of altering comprises adjusting thermal conductivity of a heat transfer path between said second portion of said coolant passageway and said cooler plate.

4. The method according to claim 1, wherein said step of altering comprises insulating said second portion of said coolant passageway with the wrapping.

5. The method according to claim 1, comprising:
identifying at least one temperature in said second portion;
establishing a predetermined temperature to be achieved in said second portion; and
adjusting said heat transfer characteristic of the second portion so as to alter the temperature of said second portion from being at said at least one temperature to being at said predetermined temperature.

6. The method of claim 5, wherein said predetermined temperature corresponds to a predetermined operating characteristic of said stack of fuel cells.

7. The method of claim 6, wherein said predetermined operating characteristic includes reducing carbon monoxide poisoning of said stack of fuel cells.

8. The method of claim 6, wherein said predetermined operating characteristic includes promoting condensation of electrolyte.

9. The method of claim 6, wherein said predetermined temperature corresponds to promoting condensation of electrolyte and reducing carbon monoxide poisoning of said stack of fuel cells.

10. An apparatus, comprising:
a plurality of fuel cells arranged in a stack; and
a cooler plate thermally coupled to at least one of said fuel cells, said cooler plate having a coolant passageway comprising:
a first portion that provides a first heat transfer characteristic between said cooler plate and coolant in the first portion; and
a second portion that includes a material, wrapping, or texture that is not associated with the first portion and that causes the second portion to provide a heat transfer characteristic between said cooler plate and coolant in the second portion that differs from the heat transfer characteristic of the first portion.

11. The apparatus according to claim 10, wherein said heat transfer characteristic is thermal conductivity.

12. The apparatus according to claim 11, wherein said thermal conductivity is higher in said second portion than in said first portion.

13. The apparatus according to claim 11, wherein said thermal conductivity is lower in said second portion than in said first portion.

14. The apparatus according to claim 10, wherein said heat transfer characteristic is thermal conductance.

15. The apparatus according to claim 10, wherein said coolant passageway comprises a metal tube.

16. The apparatus according to claim 15, wherein the second portion includes the wrapping, and the wrapping causes the second portion to provide the heat transfer characteristic that differs from the heat transfer characteristic of the first portion.

17. The apparatus according to claim 10, wherein the wrapping comprises a plastic that surrounds said second portion.

18. The apparatus according to claim 10, wherein the wrapping comprises a plastic shrink wrap that surrounds said second portion.

19. The apparatus according to claim 10, wherein the second portion includes the material, and the material causes the second portion to provide the heat transfer characteristic that differs from the heat transfer characteristic of the first portion, and the material comprises an additive to said cooler plate.

* * * * *